United States Patent
Wilson

[11] Patent Number: 5,975,142
[45] Date of Patent: Nov. 2, 1999

[54] REMOVABLE CLOSURE SYSTEM

[75] Inventor: Michael L. Wilson, Kellyville, Okla.

[73] Assignee: TDW Delaware, Inc., Wilmington, Del.

[21] Appl. No.: 09/132,077

[22] Filed: Aug. 10, 1998

[51] Int. Cl.⁶ .................................................. F16L 55/16
[52] U.S. Cl. ............................................... 138/89; 138/90
[58] Field of Search .................................. 138/89, 90, 92, 138/94, 96 R

[56] References Cited

U.S. PATENT DOCUMENTS

| | | | |
|---|---|---|---|
| 2,010,200 | 8/1935 | Ruefener et al. | 138/89 X |
| 2,281,145 | 4/1942 | Duey | 138/89 |
| 2,287,750 | 6/1942 | Clayton | 138/89 X |
| 2,431,778 | 12/1947 | Sosaya | 138/89 |
| 2,512,041 | 6/1950 | Steele | 138/89 X |
| 3,114,528 | 12/1963 | Forest | 138/89 X |
| 3,155,116 | 11/1964 | Vernooy | 138/89 |
| 3,179,446 | 4/1965 | Paterson | 138/89 X |
| 3,483,894 | 12/1969 | Finocchiaro | 138/90 |
| 3,765,456 | 10/1973 | Karpenko | 138/89 |
| 3,766,947 | 10/1973 | Osburn | 138/89 |
| 4,377,185 | 3/1983 | Katz | 138/90 |
| 4,387,740 | 6/1983 | Vanzant | 138/89 |
| 4,466,550 | 8/1984 | Sullivan | 220/206 |
| 4,576,778 | 3/1986 | Ferree et al. | 376/203 |
| 4,609,209 | 9/1986 | Ralls | 285/24 |
| 4,693,278 | 9/1987 | Wilson et al. | 138/89 |
| 4,902,043 | 2/1990 | Zillig et al. | 285/4 |
| 5,035,266 | 7/1991 | Benson et al. | 138/92 |
| 5,038,830 | 8/1991 | Arnaud | 138/89 |
| 5,437,309 | 8/1995 | Timmons | 138/89 |
| 5,450,765 | 9/1995 | Stover | 73/866.5 |

*Primary Examiner*—Patrick Brinson
*Attorney, Agent, or Firm*—Head Johnson & Kachigian

[57] ABSTRACT

A closure for a tubular member having a first surface of a first internal diameter and a second surface of an enlarged internal diameter providing a circumferential ledge, and, in the second surface an increased internal diameter circumferential slot, the closure being formed of a cylindrical plug removably positioned within the tubular member and in engagement with the circumferential ledge and an expandable snap ring having a collapsed and an expanded condition and receivable in the expanded condition within the circumferential slot to capture the plug between the circumferential ledge and the snap ring and a keeper plate of external diameter equal the internal diameter of the snap ring when the snap ring is in its expanded condition, the keeper plate being receivable within the snap ring when said snap ring is within the circumferential slot and serving to prevent dislodgement of the snap ring.

12 Claims, 2 Drawing Sheets

REMOVABLE CLOSURE SYSTEM

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

It is frequently necessary to close an opening in a tubular member either permanently or semi-permanently, that is, to close an opening where a valve is not required or is not desirable. One example of a semi-permanent closure arises when a hot tap is made into a pipeline or a vessel through a fitting connected to the pipeline or vessel. In the typical hot tapping application as utilized in the petroleum industry, a fitting is welded on the exterior of a pipe that has flowing gas or liquid under pressure. A flange is then secured to the fitting and a hot tapping machine secured to the flange. By use of highly specialized equipment, a hole can then be drilled through the wall of the pipe while a gas or liquid continues to flow through it to provide access to the interior of the pipe, such as for inserting equipment to temporarily block flow through the pipe while repairs are being made to it. After the repairs are complete the equipment is removed but the opening that provides communication to the interior of the pipe needs to be closed. Preferably the closure is made in such a way that at some future date access can be again obtained through the fitting to the interior of the pipe. This is just one example of the need for a closure for an opening in a tubular member.

For background information relating to closure devices, reference may be had to the following United States patents:

| U.S. Pat No. | Patentee |
| --- | --- |
| 3,155,116 | B. VER NOOY |
| 3,483,894 | FINOCCHIARO |
| 3,766,947 | OSBURN |
| 4,377,185 | KATZ |
| 4,387,740 | VANZANT |
| 4,466,550 | SULLIVAN |
| 4,576,778 | FERREE ET AL. |
| 4,609,209 | RALLS |
| 4,693,278 | WILSON ET AL. |
| 4,902,043 | ZILLIG ET AL. |
| 5,035,266 | BENSON ET AL. |
| 5,038,830 | ARNAUD |
| 5,437,309 | TIMMONS |
| 5,450,765 | STOVER |

BRIEF SUMMARY OF THE INVENTION

This invention provides a removable closure including a tubular member having a cylindrical opening for the passage of tools or for flow of liquids or gases. In a typical application of the invention the closure may be in the form of a flange member, that is, a tubular member that has an integral radially extending flange portion that is readily adaptable for the attachment of other structural or piping devices. The tubular member has an inner end and an outer end and an internal passageway that is defined by a first surface at a first internal diameter adjacent the inner end and a second surface of a larger internal diameter adjacent the outer end, the difference in internal diameters providing a circumferential ledge. The tubular member second cylindrical surface has an increased internal diameter circumferential slot therein that is spaced from the circumferential ledge.

A cylindrical plug is positioned within the tubular member. The plug has an external diameter greater than the tubular member first cylindrical surface and slightly less than that of the second cylindrical surface. The cylindrical plug is thereby telescopically positionable within the tubular member second internal cylindrical surface and in engagement with the circumferential ledge.

An expandable snap ring has a collapsed and an expanded condition. When in the collapsed condition the snap ring has an external cylindrical diameter less than said tubular member second internal cylindrical diameter so that the snap ring is telescopically positionable within the tubular member above the plug. In its expanded condition, the snap ring fits into the tubular member circumferential slot so that the plug is captured between the circumferential ledge and the snap ring.

The snap ring is toroidal, having a cylindrical axis and an internal and an external circumferential surface. The external circumferential surface is preferably cylindrical whereas the internal circumferential surface is preferably frusto-conical so that when the snap ring is in its expanded condition and fully outwardly received in the circumferential slot the snap ring presents an intruding frusto-conical surface extending into the tubular member second cylindrical surface.

A keeper plate is telescopically positionable within the tubular member second cylindrical surface and is positioned within the expanded snap ring. In the preferred arrangement the keeper plate has an external circumferential surface that is frusto-conical, matching the frusto-conical internal surface of the snap ring when the snap ring is in its expanded condition.

The invention includes a way to retain the keeper plate within the expanded snap ring. One way includes an opening through the keeper plate in alignment with a threaded recess in the plug. A threaded bolt extends through the keeper plate and threadably into the plug so that the bolt, when tightened, holds the keeper plate securely within the snap ring.

To ensure against leakage of fluids or gases passed the plug, one or more circumferential grooves are provided on the plug external circumferential surface, each groove receiving an O-ring or other form of sealing gasket.

In a preferred embodiment of the invention the snap ring is, in its natural state, that is when not otherwise under force to enlarge it, is in the collapsed condition in which its external diameter is less than the tubular member second internal surface. The snap ring is radially outwardly expanded by the keeper plate. Specifically, the interaction of the keeper plates external frusto-conical surface and the snap ring internal frusto-conical surface is such that when the keeper plate is forced into the snap ring in the direction towards the plug the keeper plate causes the snap ring to externally expand into the circumferential slot. When the keeper plate is removed the snap ring will, on its own, resiliently contract towards its normal collapsed condition thereby automatically extracting itself, or at least substantially extracting itself, from the circumferential groove. This action permits easy removal of the snap ring to permit removal of the plug member to provide access through the tubular member.

A better understanding of the invention will be obtained from the following description of the preferred embodiments and the claims, taken in conjunction with the attached drawings.

DESCRIPTION OF THE DRAWINGS

FIG. 1 shows a flange having a passageway therethrough and positioned within the passageway a cylindrical plug, a snap ring and a keeper plate by which the passageway is closed against the passage of liquids or gases.

DETAILED DESCRIPTION OF THE PREFERRED EMBODIMENTS

Figure 1:
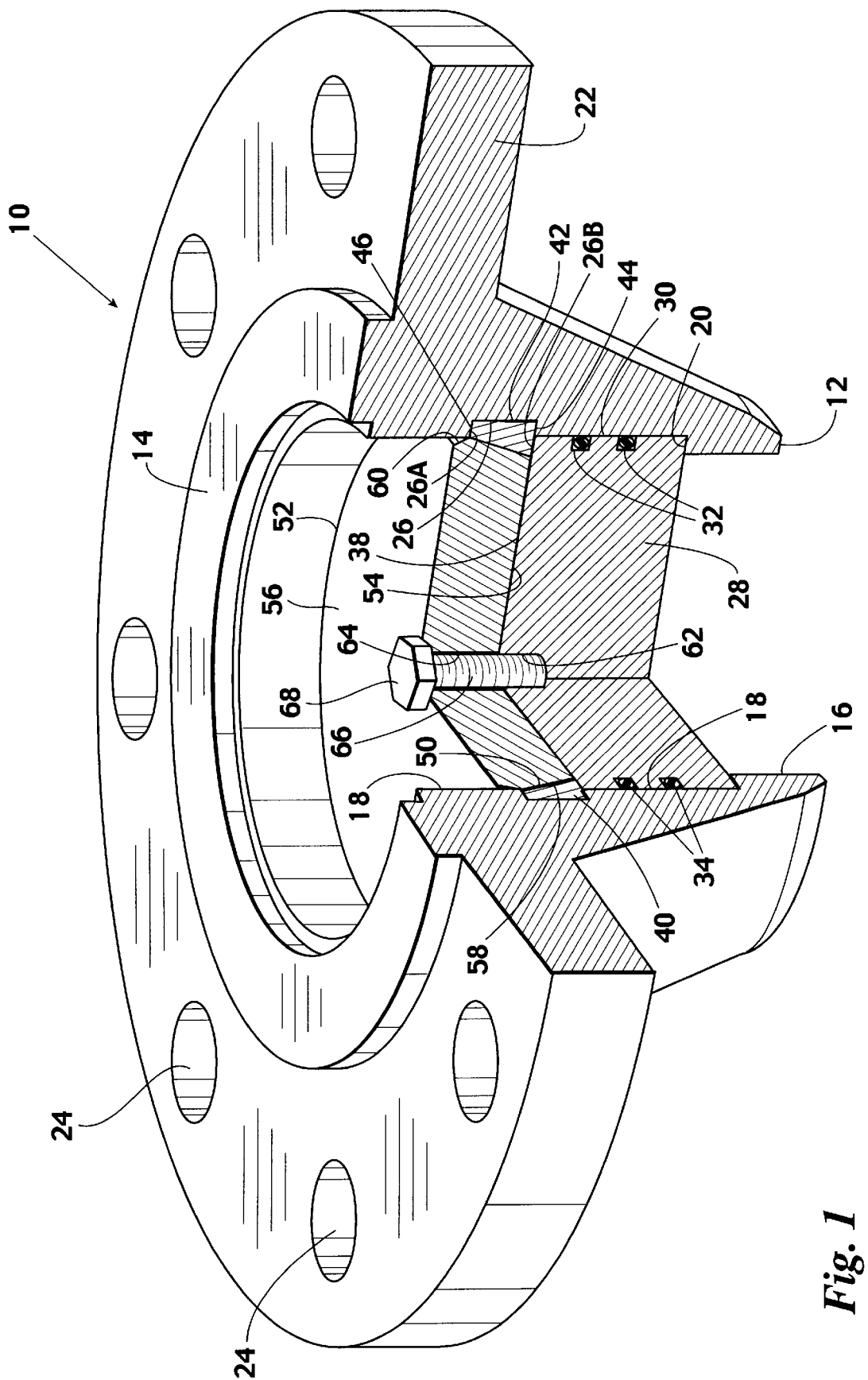
FIG. 1 is an isometric elevational view, shown cut away, of a tubular member in the form of a flange and showing the closure system of this invention. Specifically.
Figure 2:
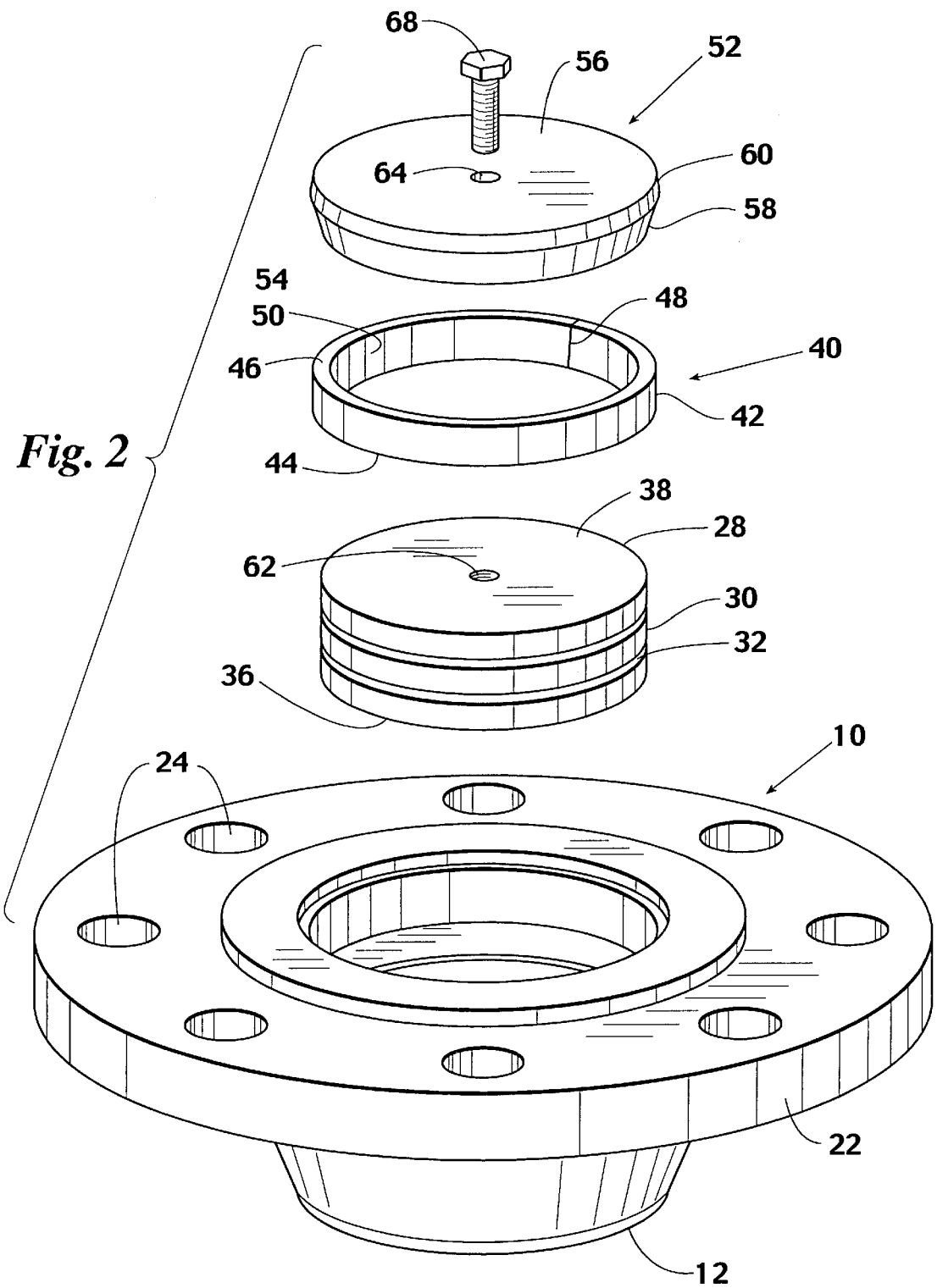
FIG. 2 is an isometric exploded view of the removable closure system of FIG. 1 showing the basic components having been removed from the interior of the tubular flange member.

Referring to the drawings, that is to both FIGS. 1 and 2, the removable closure system of this invention is illustrated as applicable to a flange fitting generally indicated by the numeral 10. A "flange" is a commonly employed piping fitting frequently utilized in the piping industry, including the petroleum and petrochemical industries. The invention is not limited to the use of a flange but is a system for removably closing a tubular member, flange 10 being an example of a tubular member and is illustrated herein only because it is a typical environment for the application of the closure system of this invention. Flange 10 has an inner end 12 and an outer end 14. Inner end 12 is shown of the type that is particularly configured for welding to the end of a length of pipe or to other equipment. Flange 10 has an opening therethrough defined by a first internal cylindrical surface 16 and a second internal cylindrical surface 18. Second cylindrical surface 18 is of enlarged internal diameter compared to first cylindrical surface 16 providing a circumferential ledge 20.

Flange 10 illustrated as an example of a tubular member has an integral radially extending flange portion 22 with openings 24 therein by which another flange or other apparatus may be secured to it, it being understood that the radial flange portion 22 is not material to this invention. Other features of flange 10 are illustrated as are typical of this type of device but are not important to the invention. The only elements of flange 10 that are important is the passageway defined by first cylindrical surface 16, second cylindrical surface 18, circumferential ledge 20 and an increased internal diameter circumferential slot 26 formed in second cylindrical surface 18, slot 26 having a planer top end surface 26A and an opposed, paralleled, bottom end surface 26B.

To removably close the opening through flange 10 a cylindrical plug 28 is employed. Plug 28 has an external cylindrical surface 30 that is larger than flange first cylindrical surface 16 and slightly less in diameter than flange second cylindrical surface 18 so that plug 28 is telescopically positionable within the opening in the flange and rests upon circumferential ledge 20.

To seal against the passage of liquids or gases through the flange, plug 28 is illustrated to have two spaced apart circumferential grooves 32, each of which receives an O-ring or other form of gasket 34. In FIG. 2 grooves 32 are shown in the external cylindrical surface 30 of plug 28 but the O-rings are not shown. While two grooves 32 and O-rings 34 are shown only one may be employed and other types of seals may be employed to prevent leakage through the closed passageway.

Plug 28 has a bottom surface 36, the outer circumferential edge of which rests on circumferential ledge 20, and a top surface 38.

In order to retain plug 28 in position within the flange an expandable snap ring, generally indicated by the numeral 40, is employed. Snap ring 40 is toroidal having an external cylindrical surface 42, a bottom end 44 and a top end 46. Snap ring 40 is dimensioned to be received within circumferential slot 26, between the slot end surfaces 26A and 26B, when the snap ring is radially outwardly extended to its expanded condition. In FIG. 2 snap ring 40 is shown in its normal, collapsed condition, that is, wherein the slit 48 formed in the snap ring is closed or at least substantially closed. Snap ring 40 can be radially outwardly expanded to move into circumferential slot 26. Radially outwardly expansion increases the width of slit 48.

Snap ring 40 has an internal circumferential surface 50 that is frusto-conical. The frusto-conical surface 50 tapers downwardly and inwardly to a reduced internal circumferential diameter at the snap ring bottom end 44.

In order to radially outwardly expand snap ring 40 and to maintain the snap ring in its expanded condition, a keeper plate 52 is employed. Keeper plate 52 has a bottom surface 54 and a top surface 56, both of which are preferably planar. Keeper plate 52 is dimensioned to be telescopically positionable within flange passageway second cylindrical surface 18 and has an external circumferential surface defined primarily by a frusto-conical surface 58. The frusto-conical surface 58 terminates at its upper end, that is, at the keeper top surface 56 by a circumferential bevel 60, however, bevel 60 is not critical or important and bevel 60 may be eliminated with the frusto-conical surface 58 extending all the way to keeper top surface 56. Instead of circumferential bevel 60, a short height cylindrical surface of external diameter slightly less than the diameter of flange second cylindrical surface 18 may be employed.

The interrelationship between keeper plate external frusto-conical surface 58 and snap ring internal frusto-conical surface 50 is important. A fundamental purpose of keeper plate 52 is to maintain snap ring 40 in its expanded condition within circumferential slot 26. In addition to maintaining the snap ring in its expanded condition to thereby keep plug captured within the flange, keeper plate 52 is also important in the installation of the closure system within the flange. As previously stated, in the preferred embodiment snap ring 40 is, when in its normal condition, collapsed as illustrated in FIG. 2. When the closure system is assembled, plug 28 is first positioned within the flange followed by positioning snap ring 40 on plug upper surface 38. Since the snap ring in its collapsed condition has an external cylindrical surface of a diameter less than flange second internal diameter 18 it is easily positionable within the flange. In order to expand the snap ring within circumferential slot 26, keeper plate 52 is placed on top of the snap ring and the plate is then forced downwardly towards plug 28. The interaction of external frusto-conical surface 58 of keeper plate 52 with snap ring internal frusto-conical surface 50 causes the snap ring to radially outwardly expand into circumferential slot 26 as illustrated in FIG. 1.

When a workmen desires to open the passageway through flange 10, keeper plate 52 is removed from within snap ring 40 and the natural resilient memory of the snap ring causes it to collapse to its minimum external diameter condition thereby withdrawing or at least substantially withdrawing the snap ring from circumferential slot 26. If the snap ring does not fully withdraw from the circumferential slot at least the withdrawal will be sufficient that by means of pliers or other tools, the snap ring can be fully extracted from the slot and thereby removed from within the flange permitting the subsequent removal of plug 28.

The action of snap ring 40 is opposite to the action of a typical snap ring placed in an internal circumferential slot in that typical snap rings are biased to radially expand outwardly and must be compressed against natural resilience in order to permit the typical snap ring to be removed from an internal circumferential slot. Since snap ring 40 functions contrary to the typical snap ring, keeper plate 52 is imperative in the operation of the closure system.

In the preferred practice of the invention a way is required to maintain keeper plate 52 in position within the snap ring. One way of maintaining the keeper plate in contact with the internal circumferential surface of the snap ring is illustrated in the drawings in which plug 28 has a threaded recess 62 and keeper plate 52 has an opening 64 in alignment with recess 62. A threaded bolt 66 extends through opening 64 and is threaded into threaded recess 62, the head 68 of the bolt serving to maintain the keeper plate in fixed position with respect to plug 28 and thereby to maintain the keeper plate within snap ring 40. In the illustrated and preferred arrangement, the snap ring and keeper plate are dimensioned so that when the keeper plate is in contact with the top surface 38 of plug 28, snap ring 40 is fully radially outwardly positioned within circumferential slot 26.

To open the closure in flange 40 a workmen first removes bolt 66 by applying a wrench to head 68. Keeper plate 52 may then be removed from within snap ring 40, permitting the snap ring to contract to its natural condition by which it withdraws, or at least substantially withdraws from circumferential slot 26. After the snap ring is removed, plug 28 may then be removed. To augment removal of keeper plate 52 threaded recesses (not shown) may be provided in the top surface 56 to receive bolts for use in attaching tools to extract the keeper plate and once the keeper plate is extracted, bolt 68 can be reinserted into threaded opening 62 to aid in the removal of plug 28.

In the drawing a single bolt 66 is employed to maintain keeper plate 52 in position, however, a plurality of bolts, none of which need to be centered with respect to the keeper plate and plug, may be employed.

An advantage of the removable closure system as described herein, particularly when it is applied to flange 10 of the type illustrated in FIGS. 1 and 2 is that flange 10 may be manufactured by modifying an off-the-shelf available flange fitting. All that is required to modify a typical flange fitting is to internally turn second cylindrical surface 18 and circumferential slot 26. None of the other typical features of the commercially available flange need to be modified to enable it to function to accept the removable closure system as has been described herein. Thus the entire system as illustrated in FIGS. 1 and 2, including flange 10, can be manufactured at a substantially reduced cost compared to other closure systems.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A removable closure system comprising:
   a tubular member having an inner end and an outer end, and an opening therethrough defined by a first cylindrical surface adjacent said inner end of a first internal diameter and a second cylindrical surface adjacent the outer end of an enlarged internal diameter providing a circumferential ledge, the second cylindrical surface having an increased internal diameter circumferential slot therein;
   a cylindrical plug of external diameter greater than the internal diameter of said tubular member first cylindrical surface and slightly less than said second cylindrical surface, the cylindrical plug being telescopically positionable within said tubular member second internal cylindrical surface and in engagement with said tubular member circumferential ledge;
   an expandable snap ring having a collapsed and an expanded condition and when in the collapsed condition having an external diameter less than said tubular member second internal cylindrical surface and in the expanded condition of external diameter greater than said tubular member second internal cylindrical surface, the snap ring having a cross-section configured and dimensioned so that it is removably receivable in said expanded condition within said circumferential slot, and when in said circumferential slot having an internal diameter that is, at least in part, less than said tubular member second internal surface whereby when the snap ring is in expanded position within said circumferential slot said plug is captured between said circumferential ledge and the snap ring; and
   a keeper plate of external diameter slightly less than said internal diameter of said snap ring when said snap ring is in said expanded condition and being removably receivable within said snap ring when said snap ring is in said expanded condition and within said circumferential slot and serving to prevent the dislodgement of said snap ring from said circumferential slot.

2. A removable closure system according to claim 1 wherein said tubular member is a flange member having an integral flange portion.

3. A removable closure system according to claim 1 including an attachment to removably maintain said keeper plate within said snap ring.

4. A removable closure system according to claim 1 wherein said keeper plate is at least in substantial contact with said plug when within said snap ring.

5. A removable closure system according to claim 1 wherein said keeper plate has an opening therethrough and wherein said plug has a threaded recess in alignment with said keeper plate opening and including a bolt received in said opening and said recess by which said keeper plate is retained within said snap ring.

6. A removable closure system according to claim 1 wherein said snap ring is normally in said collapsed condition and naturally resiliently collapses when said keeper plate is removed so that thereby the snap ring automatically tends to withdraw from said circumferential slot except when held in said circumferential slot by said keeper plate.

7. A snap ring positionable in an internal circumferential groove in a cylindrical surface, the groove having an internal diameter of X and opposed end surfaces that are planar and parallel to each other and spaced apart a distance "Y", the snap ring being an integral, unitary toroid having opposed paralleled planar end surface spaced apart a distance slightly less than "Y" and having internal and external circumferential surfaces, having a slit therein and being collapsible to at least substantially close the slit in which the external circumferential surface has a diameter less than X and expandable to open said slit in which the external circumferential surface has a diameter greater than X, and wherein said internal circumferential surface is frusto-conical, the snap ring being receivable within the internal circumferential groove as said slit is expanded.

8. A snap ring according to claim 7 wherein said snap ring external circumferential surface is cylindrical.

9. A snap ring according to claim 7 wherein the snap ring is normally resiliently collapsed wherein said slit is at least substantially closed except when moved into an expanded condition with said slit widened by application of an internally applied force.

10. A combination snap ring and retainer in which the snap ring is positionable in an internal circumferential groove in a cylindrical surface that has an internal diameter of X and opposed end surfaces that are planar and parallel to each other and spaced apart a distance "Y" the snap ring being an integral, unitary toroid having opposed paralleled planar end surfaces spaced apart a distance slightly less than "Y" having an internal circumferential surface, having an external circumferential surface, having a slit therein and having a collapsed condition in which said slit is at least substantially closed and the external circumferential surface has a diameter less than X and having an expanded condition in which said slit is opened and in which the external circumferential surface has a diameter greater than X, and wherein said internal circumferential surface is frusto-conical, the snap ring being receivable within the internal circumferential groove as said slit is expanded; and a keeper plate having a frusto-conical external circumferential surface dimensioned to be partially received within said snap ring when in said collapsed condition and at least substantially more fully receive within said snap ring when in said expanded condition.

11. A combination snap ring and retainer according to claim 10 including:

an attachment to removably retain said keeper plate within said snap ring.

12. A combination snap ring and retainer according to claim 10 wherein said snap ring is normally in said collapsed condition and is expandable into said expanded condition only by the application of outward radial force, said snap ring thereby tending to return to said collapsed condition when contact by said keeper plate is removed.

* * * * *